United States Patent [19]

Hayosh et al.

[11] Patent Number: 4,508,280
[45] Date of Patent: Apr. 2, 1985

[54] TAPE DECK WITH TAKE-UP REEL ROTATION SENSOR CONFIGURED TO PREVENT TAPE WINDUP ON THE CAPSTAN OR PINCH ROLLER

[75] Inventors: Robert J. Hayosh; Robert H. Lewis, both of Farmington Hills; Frederick A. Simon, Ann Arbor, all of Mich.

[73] Assignee: Ford Motor Company, Dearborn, Mich.

[21] Appl. No.: 565,768
[22] PCT Filed: Nov. 9, 1983
[86] PCT No.: PCT/US83/01768
 § 371 Date: Nov. 9, 1983
 § 102(e) Date: Nov. 9, 1983
[51] Int. Cl.³ .............. B65H 59/38; G03B 1/02; G11B 15/13
[52] U.S. Cl. .............. 242/191; 226/181; 360/71; 360/74.1
[58] Field of Search .......... 242/191, 200-204, 242/208-210; 226/181-187; 360/73, 74.1, 74.2, 360/132, 137, 129; 318/6, 7, 653; 377/17, 18, 89; 200/304, 305, 61.17

[56] References Cited

U.S. PATENT DOCUMENTS

| | | | |
|---|---|---|---|
| 3,913,519 | 10/1975 | Sugano | 200/61.17 |
| 4,348,702 | 9/1982 | Taraborrelli | 360/71 |
| 4,367,500 | 1/1983 | Furata et al. | 360/74.2 |

*Primary Examiner*—Leonard D. Christian
*Attorney, Agent, or Firm*—Paul K. Godwin, Jr.

[57] ABSTRACT

A tape deck, which incorporates a non-contacting take-up reel rotation sensing means and associated sensing circuit for enabling the capstan and take-up reel drive mechanism. A magnetic field sensor is positioned across an air gap from a take-up reel mounted magnet to sense the pulsating magnetic field and control operation of the sensing circuit. A magnetic field interrupting means is caused to assume a non-interrupting position when the take-up reel is rotated in its proper direction and to assume a magnetic field interrupting position between the magnetic and the magnetic field sensor when the take-up reel and magnet are caused to be rotated in the opposite direction.

8 Claims, 9 Drawing Figures

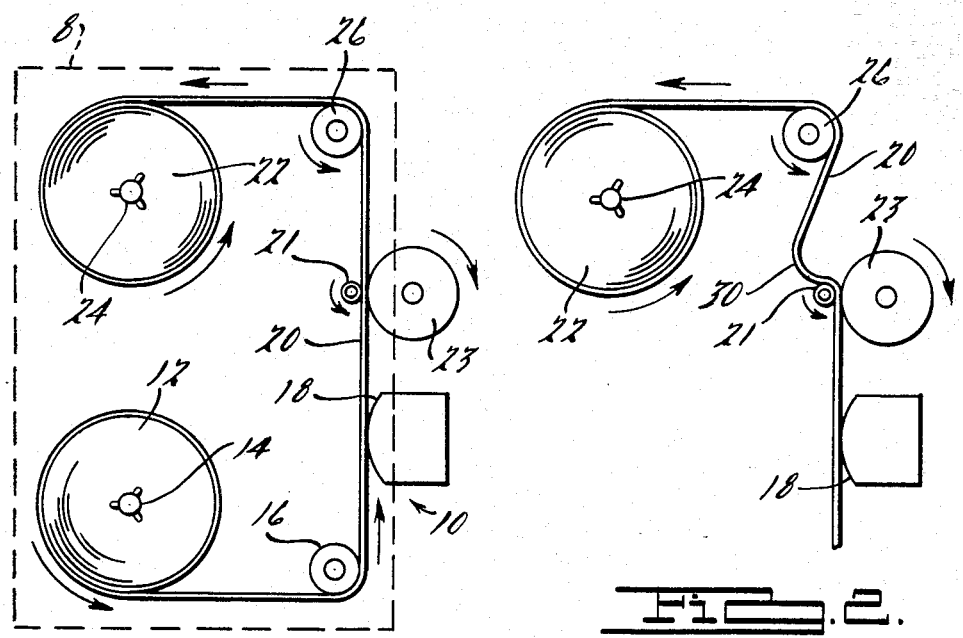
FIG. 1.
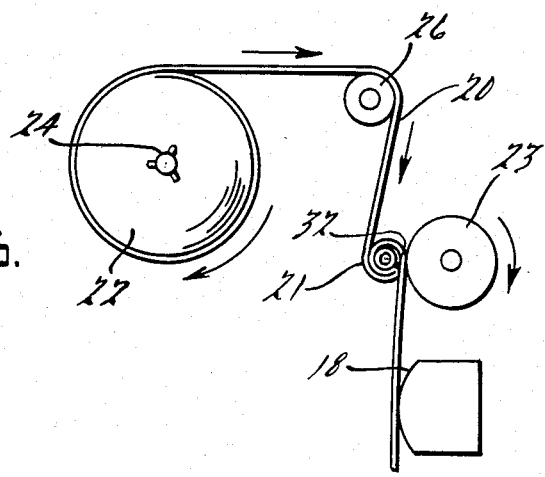
FIG. 2.
FIG. 3.
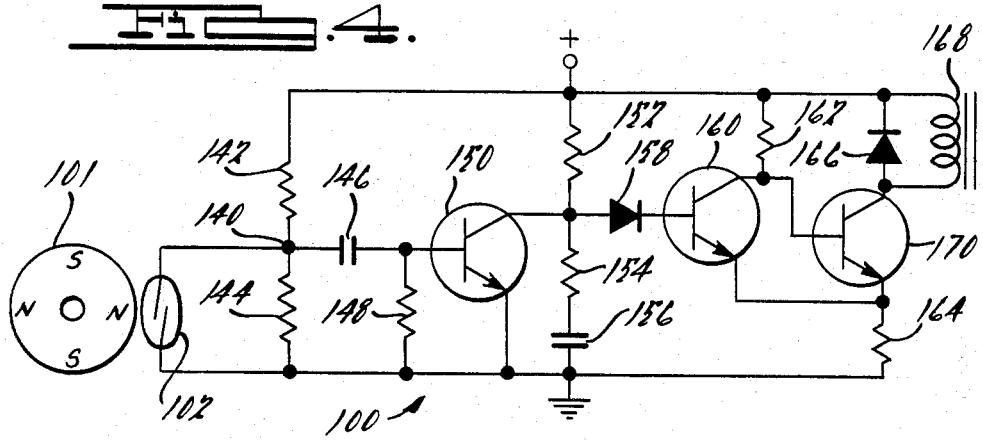
FIG. 4.

TAPE DECK WITH TAKE-UP REEL ROTATION SENSOR CONFIGURED TO PREVENT TAPE WINDUP ON THE CAPSTAN OR PINCH ROLLER

TECHNICAL FIELD

The present invention is directed to the field of web transport mechanisms and more particularly to magnetic tape decks and improvements therein.

BACKGROUND ART

Reel-to-reel type tape transport mechanisms, especially those which utilize tape cassettes, are subject to tape fouling. One of the causes of tape fouling, occurs when the tape drive mechanism is initially engaged with the tape and reels. The rotationally driven capstan engages the tape between itself and a biased pinch roller and pulls the tape across the tape head. A take-up reel is also rotationally driven, through a slip clutch, to take-up the slack in the tape after it passes from the capstan pinch roller. However, at the instant of initial start-up, a loop sometimes develops between the capstan/pinch roller and the take-up reel before the take-up reel has had a chance to remove all the slack in the tape. Depending upon the amount of slack in the tape, and the lightness of the tape, the loop sometimes has sufficient inertia to instantaneously wrap around the capstan or pinch roller, become caught between the incoming tape and the capstan or pinch roller, and be wound thereon. When this capstan or pinch roller windup occurs, the slip clutch driven take-up reel instantaneously reverses its direction of rotation, due to the tape being drawn therefrom and wound onto the capstan or pinch roller. The windup continues until it is either audibly detected and stopped by the operator or binds up the capstan/pinch roller mechanism.

When detected and stopped, the tape must be carefully unwound from the capstan or pinch roller by hand. However, in some cases, the wound up tape is folded and wrinkled so badly that it must be discarded.

Other causes of loops and potential tape windup on the capstan or pinch roller have been found to be due to: faulty bearings in the deck take-up reel spindle, causing drag; cassettes that have excessive drag on the take-up reel; tape contaminated with materials such as coffee, jelly and oil; tape formed of very lightweight material; and worn or faulty deck braking mechanisms which fail to maintain a tight take-up reel when the decks are switched between the various drive speeds such as fast forward, forward and fast reverse.

In some cassette tape decks, such as those normally installed in automotive vehicles the cassettes are inserted through an apertured panel and automatically engaged by the tape deck mechanism for playback. When the tape fully unwinds from its supply reel, except for its attached end, onto the take-up reel, the take-up reel stops rotating. A motion/stop sensing mechanism and circuit causes the tape reel and capstan drive mechanism to stop and eject the cassette or reverse the play direction, depending upon the unit.

U.S. Pat. No. 4,348,702, discloses a device for sensing tape windup on the capstan or pinch roller. The described embodiment utilizes a set of rotational contacts mounted beneath a take-up reel spindle platform so as to rotate with the platform and provide an electrical discharge path for a circuit connected to a series of printed circuit board contacts beneath the platform. The set of rotational contacts and take-up reel spindle platform are configured so that a one-way clutch is defined between the contacts and the platform whereby the contacts are only rotated when the platform is rotated in the normal, take-up direction.

Commonly assigned U.S. patent application Ser. No. 444,398 filed Sep. 30, 1982 discloses a device for sensing tape windup on the capstan or pinch roller. The disclosed embodiment utilizes a disc magnet clutch mounted on a take-up reel spindle to rotate with the spindle when it rotates in the normal take-up direction and to stop when the spindle is rotated in the opposite direction.

DISCLOSURE OF THE INVENTION

The present invention incorporates a non-contacting unidirectional reel rotation sensor that provides motion sensing indications to a corresponding circuit when the mechanism is properly operating and provides no indication to that circuit when the take-up reel is caused to stop or rotate in a reverse direction.

The invention is embodied as a modification to a prior art non-contacting motion sensing means by providing a rotatable vane to interrupt the operation of the non-contacting sensor whenever the take-up reel spindle is caused to rotate in a direction opposite to its normal take-up direction and thereby stop the operation of the tape deck.

It is, therefore, an object of the present invention to provide a device which senses the capstan tape windup and which immediately disables the engagement of the capstan against the pinch roller.

It is another object of the present invention to provide a device which prevents excessive tape fouling by distinguishing between take-up reel motion in a first direction caused by a conventional drive mechanism and reverse take-up reel motion caused by tape windup on the capstan or pinch roller.

A better understanding of the invention will be obtained by reference to the accompanying drawings and detailed description.

BRIEF DESCRIPTION OF THE DRAWINGS

FIG. 1 is a plan view of a typical reel-to-reel type tape deck under normal operating conditions.

FIG. 2 illustrates a portion of a conventional reel-to-reel cassette tape deck developing a slack tape loop adjacent the capstan.

FIG. 3 illustrates a portion of a conventional reel-to-reel cassette tape deck when the slack tape loop has wrapped around the capstan and is caught between the incoming tape and the capstan.

FIG. 4 is a schematic of a conventional motion sensing circuit which enables a relay connected to a motor for driving the take-up reel and capstan.

FIG. 7 is a cross-sectional view of a take-up reel spindle embodying the present invention during normal take-up direction rotation of the spindle.

FIG. 8 is a cross-sectional view of a take-up reel spindle embodying the present invention during reverse direction rotation of the spindle.

BEST MODE FOR CARRYING OUT THE INVENTION

Figure 5:
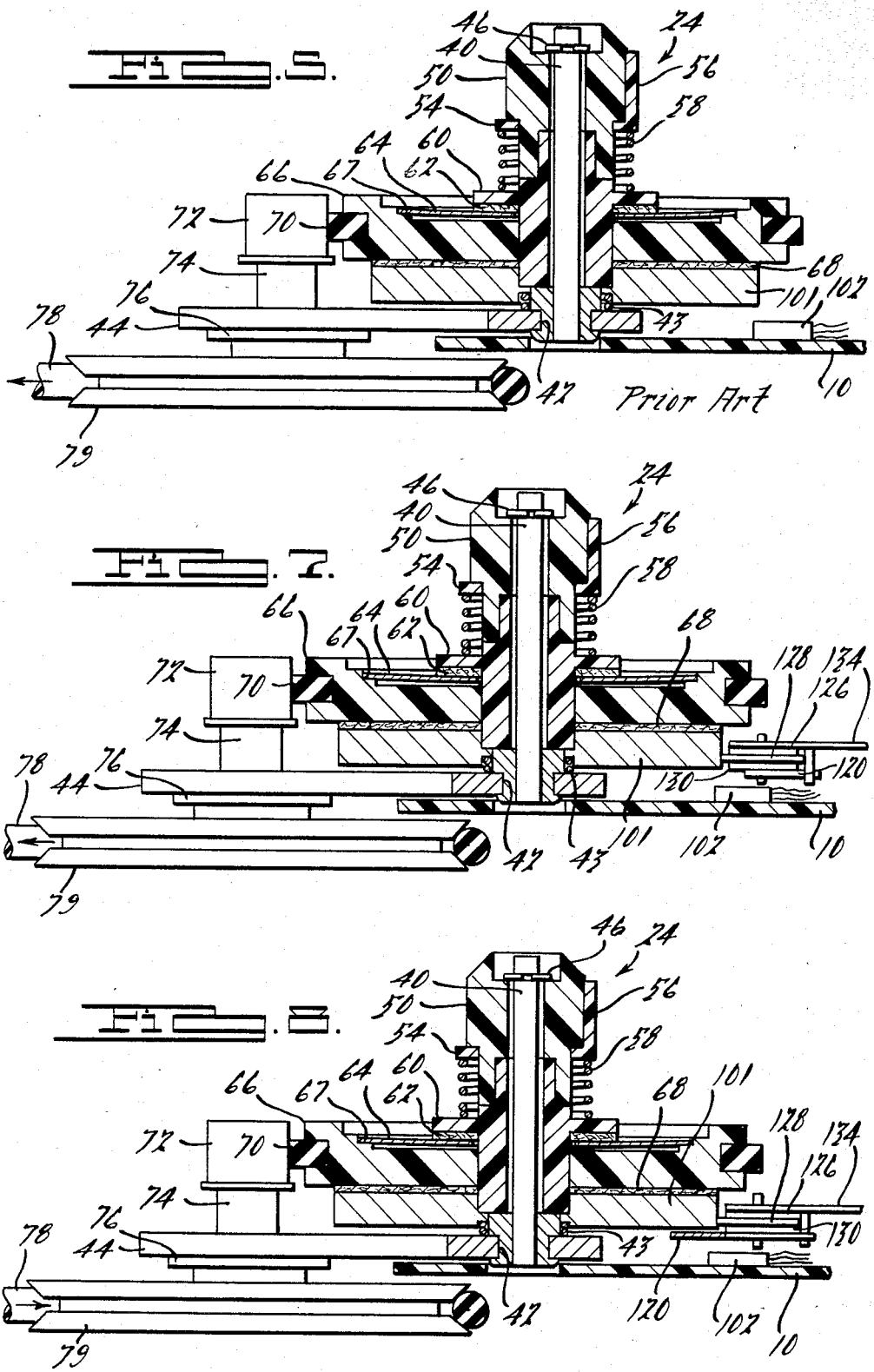
FIG. 5 is a cross-sectional view of a prior art rotationally driven take-up reel spindle with a rigidly mounted magnet positioned for rotation therewith and adjacent a non-contacting rotation sensing switch means.

FIGS. 1-5 are utilized to illustrate a conventional reel-to-reel type tape deck, its relevant components and the inherent problems.

FIGS. 6-9 illustrate an embodiment of the present invention which may be incorporated onto a conventional tape deck, without disturbing the major components thereof, in order to eliminate operational problems inherent in the conventional tape deck.

In FIG. 1, the tape deck 10 is shown as comprising a supply reel spindle 14 extending upwards from the support platform (not shown), an alignment roller 16, a playback head 18, a capstan 21, a pinch roller 23, an alignment roller 26 and a take-up reel spindle 24 extending upwards from the support platform. Magnetic recording tape 20 is shown within a cassette 8 as extending from a supply reel 12 to a take-up reel 22. The tape 20 is threaded around the alignment roller 16, across the head 18, between the capstan 21 and the pinch roller 23, and around alignment roller 26. The supply reel 12 is shown as being centered on and held by the supply reel spindle 14. Similarly, the take-up reel 22 is shown as centered on and held by the take-up reel spindle 24. In playback or record operations, the take-up reel is driven in a counterclockwise direction to take up slack in the tape which may develop between the capstan and the take-up reel. The take-up spindle 24 is driven through a slip-clutch 62 (FIG. 5) so that excessive tension will not occur on the tape 20.

The pinch roller 23 is spring biased to compress the tape 20 against the rotating capstan 21 and to thereby pull the tape 20 across the head 18.

FIG. 2 effectively illustrates a phenomena which may occur when the pinch roller 23 initially engages the tape 20 against the capstan 21 and commences to pull the tape 20 across the head 18. Often, a loop 30 develops in the tape 20 following the capstan 21. This generally occurs at start-up and before the take-up reel 22 has had a chance to remove all the slack between the capstan and the take-up reel. Of course, when the take-up reel rotates sufficiently, the loop 30 is removed and the tape 20, following the capstan 21, becomes reasonably taut.

In some instances, such as when the tape 20 is very thin, or for any of the other reasons that cause the tape to be attracted to the capstan 21, the loop 30 may have sufficient inertia to be carried in a counterclockwise direction with the rotating surface of the capstan 21 and be caught by the incoming tape. This phenomena is illustrated in FIG. 3. When this occurs in conventional tape decks, the tape commences to rapidly windup on the capstan 21. The tape is continued to be drawn across the head 18 and should eventually be audibly noticed by the operator, since the windup of tape on the capstan 21 increases the speed of the tape across the head 18 and distorts the program. However, before it is audibly detected, the windup may be so severe that the deck will eventually have to be disassembled in order to remove the tape from the capstan. Of course when capstan windup occurs, the tape 20, between the capstan 21 and the take-up reel 22, is drawn backwards towards the capstan 21, causing the take-up reel 22 and the take-up reel spindle 24 to be reversibly rotated against the slip clutch drive.

FIG. 4 illustrates a conventional motion sensor circuit 100. The motion sensing circuit 100 is connected to a non-contacting rotary switch, which in this case comprises a rotating magnet 101 mounted on the take-up reel spindle 24, and to a tape drive holding relay 168. The motion sensing circuit 100, shown in FIG. 4, contains a capacitor 146 that is charged to a level established by a voltage divider including a resistor 142 and a resistor 144 connected between a 12 volt power source and ground. The varying magnetic field produced by the rotation of the magnet 101 interacts with an adjacently positioned magnetic field sensor 102, which in this embodiment is a reed switch caused to alternately open and close. The reed switch is connected between capacitor 146 and ground and causes capacitor 146 to be periodically discharged to ground as the magnet 101 rotates. When the magnet 101 is rotating, the transistor 150 is pulse biased on and thereby periodically provides a low impedance path between ground and the junction of resistors 152 and 154. Resistors 152 and 154 are connected in series between the voltage source and a charging capacitor 156. The otherside of the charging capacitor 156 is connected to ground. Transistor 160 is biased in a nonconducting condition, when the magnet 101 is rotating and causes transistor 150 to be periodically biased on. Transistor 160 remains off as long as capacitor 156 is not permitted to charge to a predetermined level. While transistor 160 remains off, transistor 170 is biased on and completes a low impedance path to ground through resistor 164 to thereby activate holding relay 168. The activation of holding relay 168 latches the tape deck drive mechanism.

During the time that transistor 150 is biased on, capacitor 156 is prevented from charging to a potential sufficient to turn on transistor 160. Transistor 160 controls the conductivity of the third transistor 170 such that the conductive states of these two transistors are complementary. Thus, while the take-up reel rotates, transistor 160 is off and transistor 170 is on. However, when the tape becomes completely wound up on the take-up reel, the magnet 101 will cease movement and be stationary along with the take-up reel spindle 24. At that time, transistor 150 will become biased off and capacitor 156 will charge sufficiently to turn on transistor 160, thus biasing transistor 170 off and thereby deactivating holding relay 168. The deactivation of holding relay 168 functions to either release the mechanical cassette retaining element and driving mechanism; to actuate a reverse play mechanism; or to rewind the tape, depending upon the particular tape deck configuration. By appropriate selection of capacitor 156 and resistor 154, the charging time can be selected so that the circuit is more or less responsive to a termination of rotation of the take-up reels.

As an alternative embodiment of the magnetic field sensor 102, the reed switch could be replaced by any other compatible magnetic field sensitive devices such as Hall effect or Wiegand effect sensors. In addition, the holding relay 168 could be eliminated and the transistor could be connected directly to the drive motor, as engineering considerations require.

FIG. 5 is a cross-sectional view of a conventional take-up reel spindle 24 mounted for rotation about a rigid pin 40, mounted within an aperture 42 on a mounting platform 44. A bushing 43 is formed in the aperture 42 to secure the pin 40 in place. The spindle 24 comprises a two-piece spindle body 50 having upper and lower portions press-fitted together to form an integral body. The spindle body 50 has a central aperture 52 extending along its height in order to accomodate the pin 40 and to rotate freely thereabout. The upper portion of the spindle body 50 is circularly shaped so as to accomodate the take-up reel and contains a spring mounted reel lock 54 containing a plurality (3) of vertical keys 56 which mate with an equal number of keyways on the spindle body 50 and the tape reel. A spring 58 mounts beneath the reel lock 54 and applies vertical upward biasing thereto so that when the tape reel is placed on the spindle that placement will not be blocked by the vertical keys. The spindle body 50 includes a drive flange 60 extending outward therefrom to provide a biasing reference for the spring 58 on its upper surface and a clutch contact face on its lower surface. A non-woven fiber (felt) clutch pad 62 is located below the drive flange 60 and is held in a compressive state thereagainst by a flat spring washer 64. The spring washer 64 is mounted within a drive wheel 66 and has its outer edges tension adjusted against ramped stops 67, formed as part of the drive wheel 66. The drive wheel 66 is configured to surround the lower part of the spindle body 50 so that the upper surface of the spring washer 64 contacts the clutch pad 62 and so that the lower surface of the drive wheel 66 is in direct contact with a second clutch pad 68. The drive wheel 66 may be either gear driven or friction driven. In this instance, the wheel 66 is friction driven, through an elastomer band 70 mounted on the periphery of the driven wheel 66. The elastomer band 70 is in contact with a belt driven friction gear 72 attached to a rotating shaft 74 within a bushing 76 in the mounting platform 44.

A disc-shaped magnet 101 is press-fitted to the lower portion of the spindle body 50 and has its upper surface in contact with clutch pad 68. A spring 80 is located under the take-up reel spindle 24 so as to provide vertical biasing above the mounting platform 44 and thereby provide spacing between the rotating magnet 101 and the mounting platform 44. The magnet 101 is a multi-pole magnet, such as that shown in FIG. 4. The reed switch of the magnetic field sensor 102 is located adjacent the magnetic 101 so as to be periodically switched opened and closed as the magnet 101 is rotated with the spindle body 50.

As can be seen by reference to FIGS. 1-5, the conventional tape deck provides no means whereby the phenomena of capstan tape windup may be detected. Referring to FIG. 5, it can further be seen that although the driven wheel 66 is driven only in the counterclockwise take-up direction by the driving mechanism 72, the spindle body 50 and the magnet 101 are solidly connected to each other and can be rotated in either the clockwise or counterclockwise directions. The spindle body 50 and the magnet 101 are rotated by either the clutch connected driving wheel 66 in the counterclockwise direction or are rotated by the tape being pulled from the take-up reel, by a force sufficient to overcome the friction forces of the slip clutches 62 and 68, in a clockwise direction. The circuit 100 is insensitive to capstan tape windup, since the magnetic field sensor 102 senses any rotation of the magnetic 101 as the varying magnetic field continues to open and close the contacts of the reed switch.

The present invention is detailed in FIGS. 6-9 and is shown as a modification to the conventional tape deck assembly described above.

Figure 6:
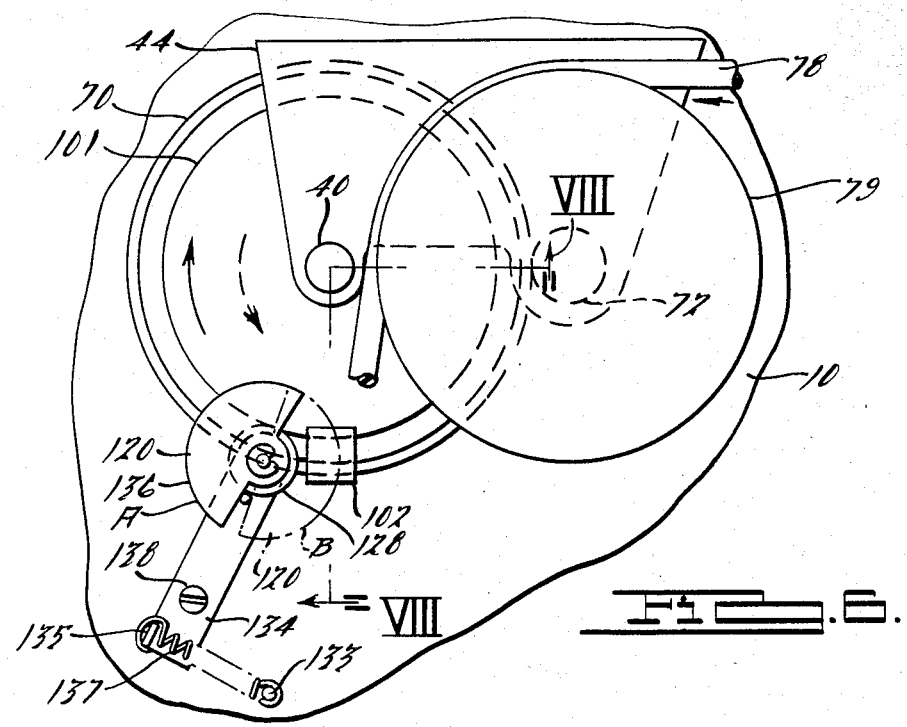
FIG. 6 is a bottom view of a portion of a tape deck incorporating the present invention.

The bottom view of a take-up reel driving mechanism is shown in FIG. 6 as it interacts with the rotating disc magnet 101 and the magnetic field sensor 102. A vane 120 is provided to be controlled by the rotation of the magnet 101 so as to assume a non-interfering position "A" (see FIG. 7) when the magnetic 101 is rotated in its normal direction, along with the spindle body 50, as indicated by the solid arrow in FIG. 6. When the magnet 101 is caused to be rotated in the opposite direction as indicated by the dashed arrow in FIG. 6, the vane 120 is immediately rotated into its interrupting position "B" (see FIG. 8) between the disc 101 and magnet 101 and the magnetic field sensor 102. The vane is constructed of a ferrous material so as to effectively interrupt the magnetic field between the rotating magnet 101 and the magnetic field sensor 102 to cause the magnetic field sensor 102 to cease providing the pulsed outputs in accordance with the varying field intensities normally sensed at that position. As a result, the circuit 100 causes deactivation of the tape drive holding relay 168 to terminate further windup of the tape on the capstan or the pinch roller and release the cassette holding mechanism.

Figure 9:
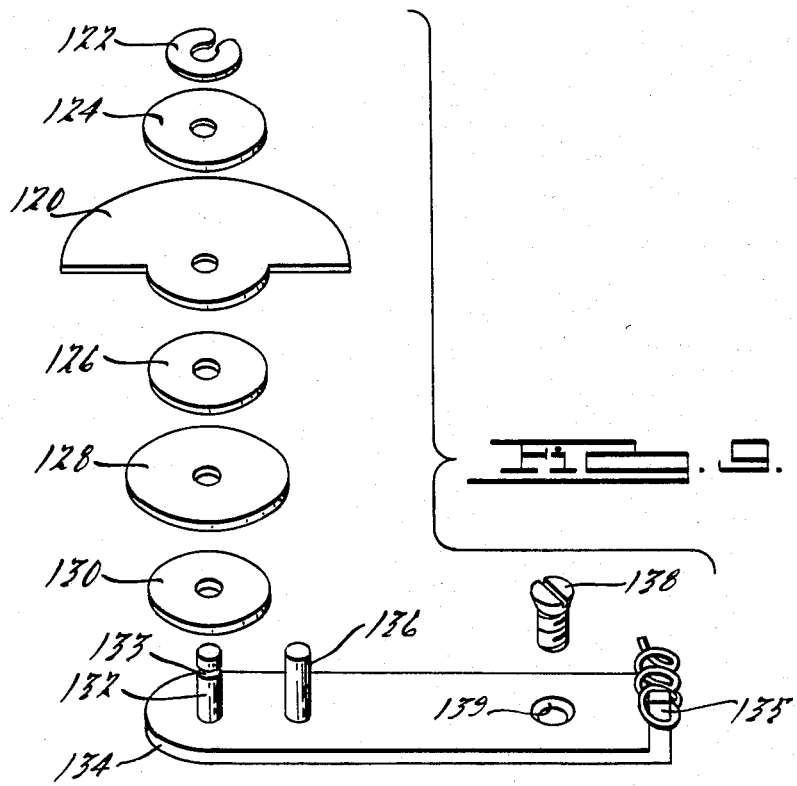
FIG. 9 is an exploded view illustrating various components used in the preferred embodiment of the present invention.

FIGS. 7, 8 and 9 illustrate the vane 120 mounted on a post 132 along with a slip washer 130, a friction drive gear 128, a slip clutch 126 and a washer 124. The assembly is loosely held in place by a spring clamp 122 which fits into a groove 133 at the top of post 132. A support arm 134 is pivotally mounted for limited rotation about screw 138 attached to deck base 10. Friction gear 128 is biased against the outer edge of the magnetic 101 by the tension forces of a spring 137 connected between a fixed reference post 133 on the deck base 10 and a spring arm 135 on the outer end of the support arm 134. Since the friction gear 128 is biased against the outer edge of the magnet 101, it responsively rotates with the magnetic 101 in an opposite direction. The driving forces of the friction gear 128 are communicated via its upper surface through slip clutch 126 and to the undersurface of the vane 120. Therefore, when the magnet 101 is rotating in the direction corresponding to the proper take-up direction as indicated in FIGS. 1 and 7, the vane 120 is rotated to its position "A" and is prevented from further rotation by stopping post 136. Whenever the magnet 101 is rotated in the opposite direction, as indicated in FIGS. 3 and 8, the friction gear 128 immediately responds and changes its rotation direction and communicates that driving force to the vane 120 which immediately rotates to its magnetic field interrupting position "B" until it abuts stopping post 136. At that point, the vane 120 is held in place until the magnet 101 is again rotated in the proper take-up direction.

It will be apparent that many modifications and variations may be implemented without departing from the scope of the novel concept of this invention. Therefore, it is intended by the appended claims to cover all such modifications and variations which fall within the true spirit and scope of the invention.

We claim:

1. A mechanism for transporting a length of tape material from a supply reel to a take-up reel including:
   means defining a mounting platform;
   a supply reel spindle and a take-up reel spindle rotationally mounted on said platform means and positioned for accepting respective supply and take-up reels;
   means connected to said platform means for driving said take-up reel spindle in a first predetermined rotational direction;

multipolar magnetic field producing means mounted to rotate with said take-up reel spindle; and means adjacent said magnetic field producing means for sensing the changes in the magnetic field only when said take-up reel spindle is rotating in said first predetermined direction.

2. A mechanism as in claim 1, wherein said sensing means includes a magnetic field sensor positioned adjacent said magnetic field producing means to sense changes in the magnetic field strength at its location; circuit means connected to said magnetic field sensor and said driving means for activating said driving means when changes in said magnetic field strength are sensed; and means for interrupting the magnetic field sufficiently between said magnetic field producing means and said magnetic field sensor to cause said circuit means to deactivate said driving means when said take-up reel spindle rotates in a direction opposite to said first predetermined direction.

3. A mechanism as in claim 2, wherein said interrupting means includes a rotatably mounted vane located to be rotated into a magnetic field interrupting position between said magnetic field producing means and said magnetic field sensor when said take-up reel spindle is rotated in a direction opposite to said first predetermined direction.

4. A mechanism as in claim 3, wherein said magnetic field producing means is a circular disc shaped multipole permanent magnet having an outer edge portion and said interrupting means further includes a first pin for supporting and mounting said vane for rotation and means on said pin for rotating said vane in response to the movement of the outer edge of said magnet.

5. A mechanism as in claim 4, wherein said vane rotating means includes a drive gear mounted on said first pin and biased to abut the outer edge of said magnet and rotate therewith; and a slip clutch between said drive gear and said vane.

6. A mechanism as in claim 5, wherein said interrupting means further includes a second pin for limiting the movement of said vane to its magnetic field interrupting position when said take-up reel rotates in a direction opposite to said first predetermined direction.

7. A mechanism as in claim 2, wherein said magnetic field sensor is a magnetic field responsive reed switch positioned with respect to said magnet so as to be opened and closed in response to changes in said magnetic field strength.

8. A mechanism for transporting a length of tape material from a supply reel to a take-up reel including:

means defining a mounting platform;

a supply reel spindle and a take-up reel spindle rotationally mounted on said platform means and positioned for accepting respective supply and take-up reels;

means connected to said platform means for driving said take-up reel spindle in a first predetermined rotational direction;

multipolar magnetic field producing means mounted to rotate with said take-up reel spindle;

means adjacent said magnetic field producing means for sensing changes in magnetic field caused by the rotation of said magnetic field producing means;

means connected to said sensing means for enabling said driving means as long as said rotation is sensed; and means between said magnetic field producing means and said sensing means for blocking the magnetic field from said sensing means when said take-up reel spindle and said magnetic field producing means are rotated in a direction opposite to said first predetermined rotational direction.

* * * * *